United States Patent
Hall

(10) Patent No.: US 9,448,780 B1
(45) Date of Patent: Sep. 20, 2016

(54) PACKAGE MANAGER VERIFIER

(75) Inventor: Ben Hall, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 811 days.

(21) Appl. No.: 13/324,779

(22) Filed: Dec. 13, 2011

(51) Int. Cl.
G06F 9/445 (2006.01)

(52) U.S. Cl.
CPC ....................................... G06F 8/61 (2013.01)

(58) Field of Classification Search
None
See application file for complete search history.

(56) References Cited

U.S. PATENT DOCUMENTS

| | | | | |
|---|---|---|---|---|
| 7,203,745 B2 * | 4/2007 | Sheehy | .................... | G06F 8/61 706/45 |
| 7,536,687 B1 * | 5/2009 | Myers | ...................... | G06F 8/68 714/10 |
| 7,636,780 B2 * | 12/2009 | Lavin | ..................... | G06F 21/51 709/223 |
| 7,953,744 B2 * | 5/2011 | Gharat | ................ | G06F 11/3688 707/758 |
| 8,185,889 B2 * | 5/2012 | Kinder | ..................... | G06F 8/61 717/136 |
| 8,250,570 B2 * | 8/2012 | Suorsa | ..................... | G06F 8/61 717/172 |
| 8,612,398 B2 * | 12/2013 | Jarrett | ..................... | G06F 8/61 175/234 |
| 8,762,931 B2 * | 6/2014 | Vidal | ..................... | G06F 8/453 717/101 |
| 2004/0181790 A1 * | 9/2004 | Herrick | .................... | G06F 8/60 717/168 |
| 2005/0198099 A1 * | 9/2005 | Motsinger | ............... | G06F 21/55 709/200 |
| 2006/0075001 A1 * | 4/2006 | Canning | .................... | G06F 8/65 |
| 2006/0161895 A1 * | 7/2006 | Speeter | .................... | G06F 8/71 717/121 |
| 2006/0184932 A1 * | 8/2006 | Burnley | .................... | G06F 8/60 717/174 |
| 2007/0140131 A1 * | 6/2007 | Malloy | ................. | H04L 43/026 370/241 |
| 2007/0271552 A1 * | 11/2007 | Pulley | ....................... | G06F 8/60 717/120 |
| 2009/0007096 A1 * | 1/2009 | Chavez | ................... | H04L 63/20 717/176 |
| 2010/0058320 A1 * | 3/2010 | Milligan | ............. | G06F 9/44505 717/173 |
| 2011/0107299 A1 * | 5/2011 | Dehaan | ............... | G06F 9/45533 717/121 |
| 2012/0117234 A1 * | 5/2012 | Miryanov | ................. | G06F 8/60 709/224 |
| 2013/0268915 A1 * | 10/2013 | Gu | ........................... | G06F 8/71 717/121 |

OTHER PUBLICATIONS

Maximum RPM: Taking the Red Hat Package Manager to the Limit, Chapter 6. Using RPM to Verify Installed Packages. Nov. 2011. Located at: http://www.rpm.org/max-rpm/s1-rpm-verify-what-to-verify.html.*

Puppet—"Puppet CookBook"—located at http://www.puppetcookbook.com/ Captured on Dec. 2, 2011.*

Maximum RPM-2011, Chapter 6. Using RPM to Verify Installed packages, captured in 2011 located at http://www.rpm.org/max-rpm/s1-rpm-verify-what-to-verify.html.*

* cited by examiner

Primary Examiner — Wei Zhen
Assistant Examiner — Hossain Morshed
(74) Attorney, Agent, or Firm — Schwegman Lundberg & Woessner, P.A.

(57) ABSTRACT

An RPM verifier is described. A master configuration file and a list of host servers are retrieved. The master configuration file defines rules for approved versions of software packages installed on each host server in the list. The RPM verifier queries each host server in the list for a version identifier of one or more software packages installed on each host server. The rules are applied to the version identifier to identify one or more mis-configured software packages on each host server.

19 Claims, 5 Drawing Sheets

US 9,448,780 B1

PACKAGE MANAGER VERIFIER

TECHNICAL FIELD

The present disclosure generally relates to computers and, in example embodiments, to computer-implemented networks.

BACKGROUND

Cloud computing and various distributed networks are becoming more prevalent to provide reliability and capacity to handle multiples of requests at the same time. Different versions of software packages may be installed on each server in the server pool/cloud. Software packages are generally installed from a local repository with instructions for the server to install from the local repository. Accordingly different software versions may be installed.

When new server machines are brought up, software packages are continuously being installed. However, there may be variations in the versions of each individual software package that is being installed. Typically, "the latest version" of an application/software package is installed but it is not always possible to determine which particular version is installed. Accordingly, different versions of applications may be installed on different servers in a server pool.

BRIEF DESCRIPTION OF THE DRAWINGS

The present disclosure is illustrated by way of example, and not by way of limitation, in the figures of the accompanying drawings in which.

DETAILED DESCRIPTION

Figure 1:
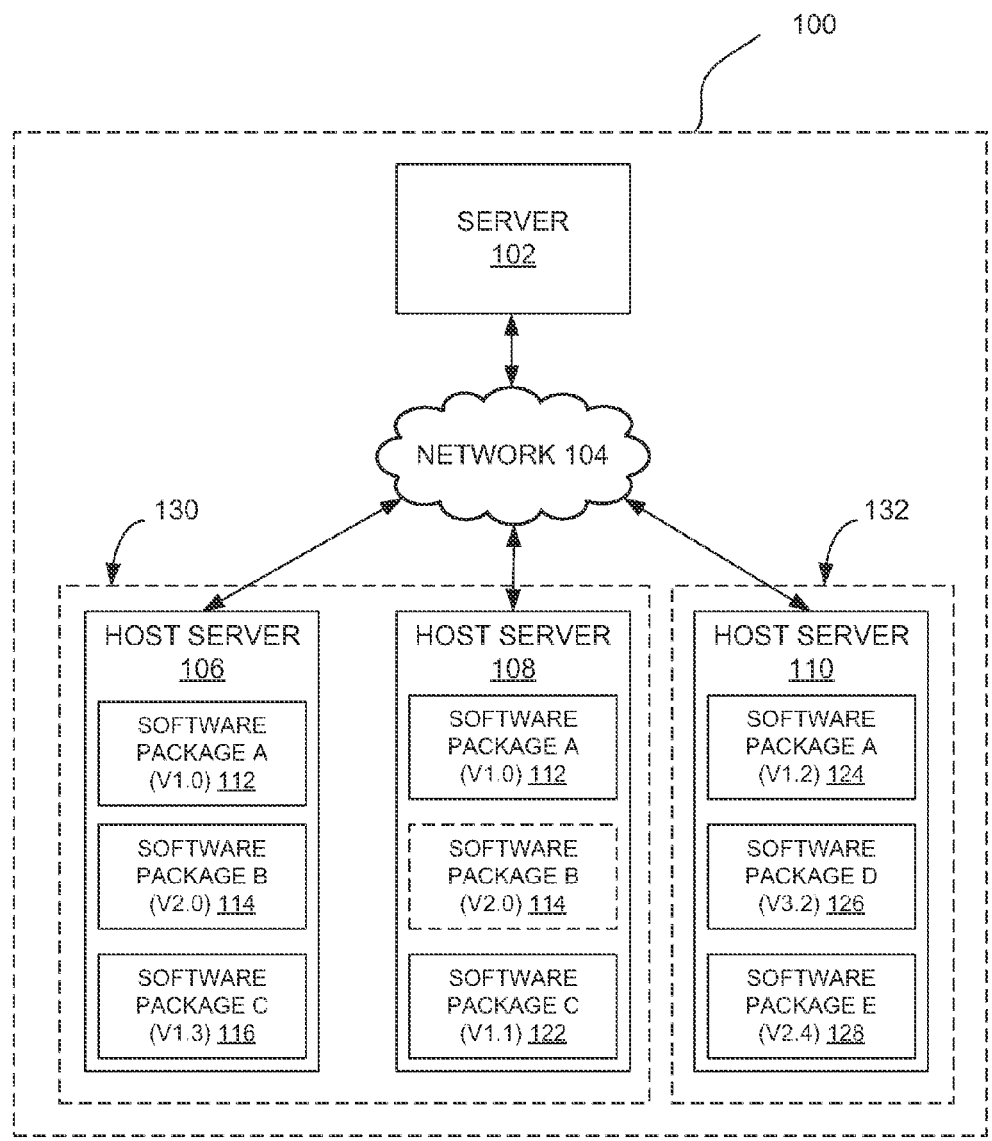
FIG. 1 is a block diagram illustrating an example of a system for implementing disclosed embodiments.

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

An RPM (RPM Package Manager) verifier module is described. The verifier module may also be referred to as a software package management verifier module. The RPM is a package management system used by system administrator to perform software installation and maintenance on multiple machines. The name RPM variously refers to the .rpm file format, files in this format, software packaged in such files, and the package manager itself. The use of RPM rather than manual building and installation of software has advantages such as simplicity, consistency and the ability for these processes to be automated and non-interactive.

The RPM verifier loads a master configuration file and a list of host servers. The master configuration file defines rules for approved versions of software packages installed on each host server in the list. The RPM verifier queries each host server in the list for a version identifier of one or more software packages installed on each host server. The rules are applied to the version identifier to identify one or more mis-configured software packages on each host server.

In one embodiment, the RPM verifier is configured to identify one or more software packages missing from a host server, one or more software packages installed on a host server having a newer version compared to the approved version of the corresponding software package for the host server as defined in the rules, or one or more software packages installed on a host server having an older version compared to the approved version of the corresponding software package for the host server as defined in the rules.

In another embodiment, the RPM verifier module has a querying module, a parsing module, and an analysis module. The querying module queries each host server in the list for the version identifier of one or more installed software packages in each host server. The parsing module parses information received from each host server in response to the query for a host server name, a software package installed on each host server, and a version of the installed software package. The analysis module applies the rules to the parsed information to identify one or more software packages missing from each host server, and one or more software packages installed on each host server having a newer or older version compared to the approved version of the corresponding software package for each host server as defined in the rules.

In one embodiment, the analysis module generates a report based on software packages. The report identifies a number of host servers having a version of an installed software package matching the version of the corresponding software package approved in the rules, a number of host servers having the version of the installed software package ahead of the version of the corresponding software package approved in the rules, a number of host servers having the version of the installed software package behind the version of the corresponding software package approved in the rules, and a number of host servers missing the installed software package specified in the rules.

In another embodiment, the analysis module generates a report based on each host server. The report identifies a number of installed software packages having a version matching the version of the corresponding software packages approved in the rules for each host server, a number of installed software packages having a version ahead of the version of the corresponding software packages approved in the rules for each host server, a number of installed software packages having a version behind the version of the corresponding software packages approved in the rules for each host server, and a number of software packages missing from each host server.

In one embodiment, the rules are based on a name of the software package, a version of the software package, and the name of host servers where the software package is to be installed. The rules may also define an approved version of a first software package for a first set of host servers, and an approved version of the first software package for a second set of host servers.

In another embodiment, the rules comprises a first set of rules applicable to a first set of host servers identified based on host server names, and a second set of rules applicable to a second set of host servers identified based on host server names.

In another embodiment, the rules comprises a first set of rules applicable to a first set of host servers of a first server pool, and a second set of rules applicable to a second set of host servers of a second server pool.

EXAMPLE NETWORKING SYSTEM

FIG. 1 illustrates an example of a system for implementing various disclosed embodiments. In particular embodiments, system 100 comprises a server 102, a network 104, a first server pool 130 (host servers 106 and 108), a second server pool 132 (host server 110).

The components of system 100 can be connected to each other in any suitable configuration, using any suitable type of connection. The components may be connected directly or over network 104, which may be any suitable network. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Each host server may be identified with its host server name or IP address.

Each host server may include one or more installed software packages. For example, version 1.0 of software package A 112, version 2.0 of software package B 114, and version 1.3 of software package C 116 may be installed on host server 106. Version 1.0 of software package A 112 and version 1.1 of software package C 122 may be installed on host server 108. Version 1.2 of software package A 124, version 3.2 of software package D 126, and version 2.4 of software package E 128 may be installed on host server 110.

The server 102 may include an RPM verifier module that is used to determine the versions of installed software packages on each host server and compare it to a master configuration file to determine mis-configured installed or missing software packages on each host server. The RPM verifier module is discussed in more detail with respect to FIG. 2.

Figure 2:
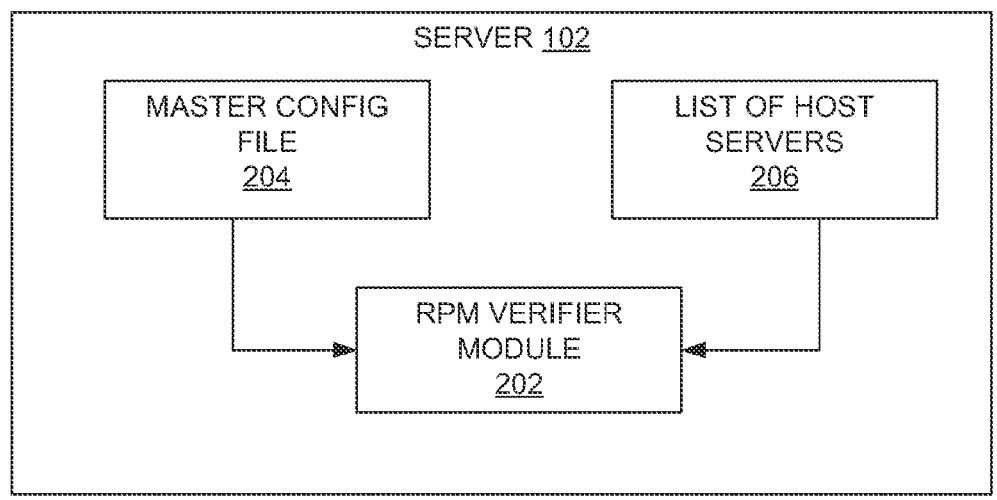
FIG. 2 is a block diagram illustrating an example server for implementing an RPM verifier module.

FIG. 2 is a block diagram illustrating the example server 102 for implementing an RPM verifier module 202. The RPM verifier module 202 loads a master configuration file 204 and a list of host servers 206 stored in a storage device to verify software packages. The storage device may be internal or external to the server 102. The list of host servers 206 may identify the host servers by their host names or IP address. Furthermore, the list of host servers 206 may identify host servers belonging on a server pool. For example, FIG. 1 illustrates host servers 106 and 108 belonging to server pool 130, and host server 110 belonging to server pool 132.

The master configuration file 204 includes rules for checking the software packages in the host servers. For example, the rules may define the approved versions of a corresponding software package for a host server or host servers from a pool of servers.

For example, the rule may require the software package A installed on every host servers 106, 108, 110 to be version 1.0. FIG. 1 illustrates a system that does not comply with this rule because the version of software package A in host server 110 is not 1.0 but 1.2.

In another example, the rule may require the software package A installed on every host servers 106, 108, 110 to be at least version 1.0. FIG. 1 illustrates a system that complies with this rule because the versions of software package A in host servers 106, 108, 110 are at least version 1.0.

In another example, the rule may require the software package A installed on host servers 106 and 108 of server pool 130 to be version 1.0 and the software package A installed on host server 110 of server pool 132 to be at least version 1.0. FIG. 1 illustrates a system that complies with this rule because the version of software package A of host servers 106 and 108 are versions 1.0 and the version of the software package A of host server 110 (version 1.2) is greater or ahead of version 1.0.

In another example, the rule may require the software package B installed on every host server 106 and 108 of server pool 130 to be version 2.0. FIG. 1 illustrates a system that does not comply with this rule because software package B is missing in host server 108.

In another example, the rule may require the software package C installed on every host server 106 and 108 of server pool 130 to be at least version 1.1 and the software package D and E installed on host server 110 of server pool 132 to be versions 3.2 and 2.4 respectively. FIG. 1 illustrates a system that complies with this rule because software package C 116 and 122 are at least version 1.1 and software package D and E are version 3.2 and version 2.4 respectively.

In another example, the rule may require the software package A installed on every server regardless of its version. FIG. 1 illustrates a system that complies with this rule because software package A is installed in each host server 106, 108, and 110.

In an alternative embodiment, business logic may be applied on the results to determine which software packages are missing, has a newer or older version installed compared to the approved version. The server 102 may easily manipulate the master configuration file 204 that controls the rules for the business logic. As previously illustrated, different rule sets may be applied on a per hostname basis or on a web pool basis.

Figure 3:
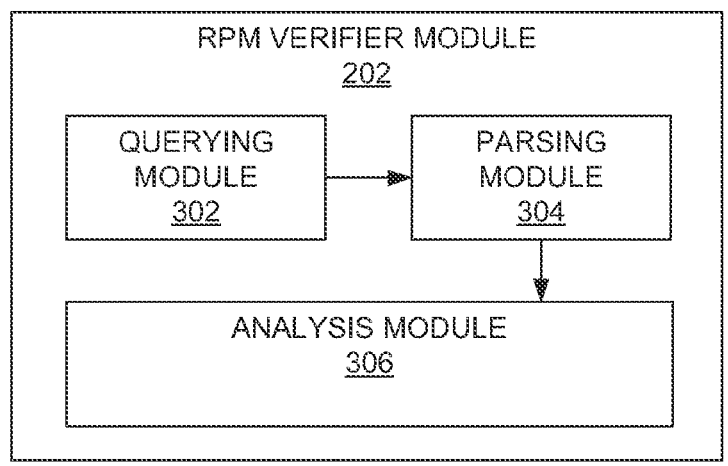
FIG. 3 is a block diagram illustrating an example RPM verifier module.

FIG. 3 is a block diagram illustrating an example of the RPM verifier module 202. The RPM verifier module 202 includes a querying module 302, a parsing module 304, and an analysis module 306. After the RPM verifier module 202 loads the master configuration file 204 and the list of host servers 206, both shown in FIG. 2, the querying module 302 uses PDSH to issue a query on each host server or destination server. In one embodiment, the querying module 302 issues a Linux based command to determine the version identifier (e.g., version 1.x) of installed software packages on the corresponding host server.

The parsing module 304 parses information received from each host server in response to the query. The information may include a list of software packages saved or installed on a host server. In another embodiment, the information may include a name of the host server, the IP address of the host server, the corresponding server pool associated with the host server, the name of software packages installed on each host server, and the version of the software packages installed on each server.

The analysis module 306 compares the parsed information against the master configuration file. In one embodiment, the analysis module 306 applies the rules from the master configuration file 204 to the parsed information to identify one or more software packages missing from each host server. In another embodiment, the analysis module 306 identifies one or more software packages installed on each host server having a newer (ahead) or older (behind) version compared to the approved version of the corresponding software package for each host server as defined in the rules.

In one embodiment, the analysis module 306 generates a report based on software packages. For example, the report may identify the number of host servers having a version of installed software packages matching the version of the corresponding software packages approved in the rules, a number of host servers having the version of the installed software package ahead of the version of the corresponding software package approved in the rules, a number of host servers having the version of the installed software package behind the version of the corresponding software package approved in the rules, and a number of host servers missing the installed software package specified in the rules.

In another embodiment, the analysis module 206 generates a report based on each host server. For example, the report identifies a number of installed software packages having a version matching the version of the corresponding software packages approved in the rules for each host server, a number of installed software packages having a version ahead of the version of the corresponding software packages approved in the rules for each host server, a number of installed software packages having a version behind the version of the corresponding software packages approved in the rules for each host server, and a number of software packages missing from each host server.

For example, the analysis module 306 may identify the following summary results after running the process on each host server:
  Total number of packages not found
  Total number of version ahead
  Total number of version behind
  Total successes In another example, the analysis module 206 may group the results by software packages:
  RPM Name (e.g., Software package A)
  Required version (e.g., 2.2 for software package A)
  Results (e.g., match: 1423, ahead: 0, behind: 4, not found: 2).

In another example, the analysis module 206 may group the results by specific hosts:
  Host Name (e.g., tool-web-10-101-41-109)
  IP address (e.g., 10.101.41.109)
  Results (e.g., match: 23, ahead: 1, behind: 0, not found: 0).

Figure 4:
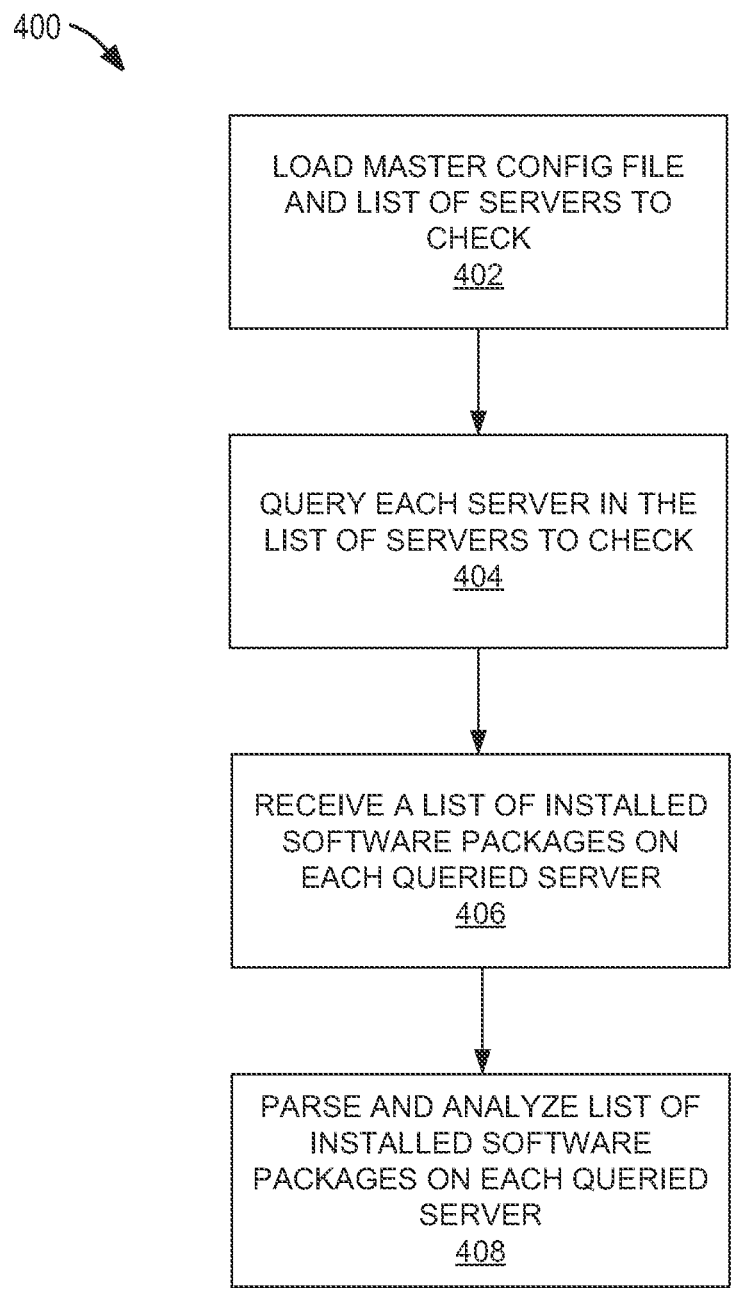
FIG. 4 is a flow diagram illustrating one example embodiment of a method for operating an RPM verifier module.

FIG. 4 is a flow diagram 400 illustrating one example embodiment of a method for operating an RPM verifier module. At 402, the RPM verifier module retrieves and loads a master configuration file and a list of host servers. The master configuration file defines rules for approved versions of software packages installed on each host server in the list of host servers.

In one embodiment, the rules may be based on a name of the software package, a version of the software package, and the name of host servers where the software package is to be installed.

In another embodiment, the rules defines an approved version of a first software package for a first set of host servers, and an approved version of the first software package for a second set of host servers.

In another embodiment, the rules comprises a first set of rules applicable to a first set of host servers identified based on a first set of host server names or a first pool of servers, and a second set of rules applicable to a second set of host servers identified based on a second set of host server names or a second pool of servers.

At 404, the RPM verifier module queries each host server in the list for a version identifier of one or more software packages installed on each host server. The version identifier includes, for example, a version number of the corresponding software package (e.g. version 1.6).

At 406, the RPM verifier module receives a list of installed software packages on each queried host server. For example, the list may include the name and version of the installed software package on the corresponding queried host server.

At 408, the RPM verifier module parses and analyzes the list of installed software packages on each queried server to identify one or more mis-configured software packages on each host server based on the master configuration file.

In one embodiment, the RPM verifier module repeats the process (querying, receiving, parsing, and analyzing) for each destination server. In another embodiment, the RPM verifier module may process on all destination servers in parallel.

Figure 5:
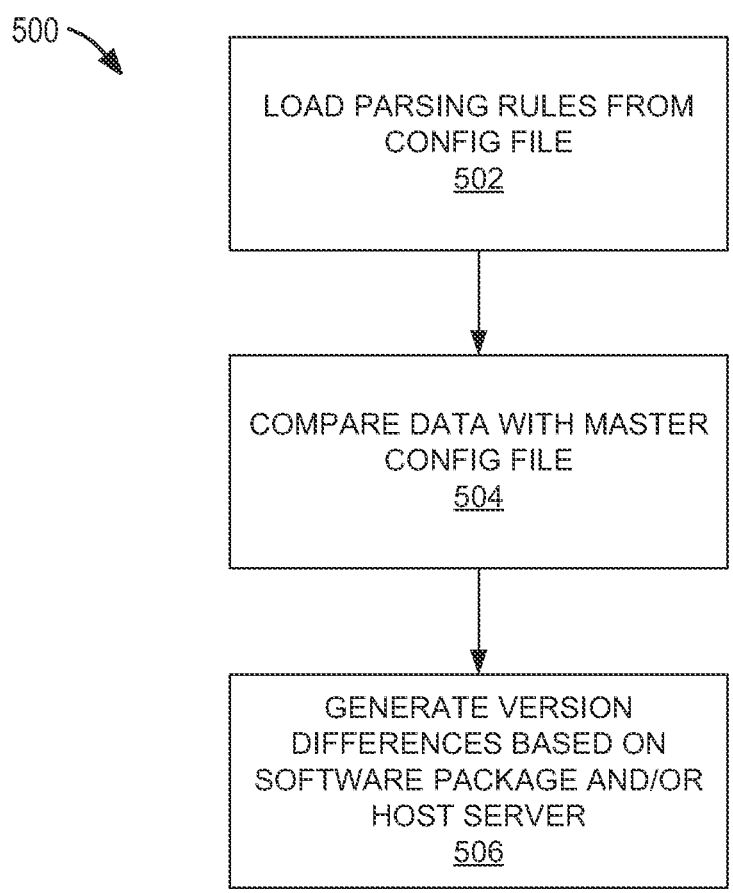
FIG. 5 is a flow diagram illustrating one example embodiment of a method for identifying mis-configured software packages on host servers.

FIG. 5 is a flow diagram 500 illustrating one example embodiment of a method for identifying mis-configured software packages on host servers. At 502, the RPM verifier module loads the rules from the master configuration file.

At 504, the RPM verifier module compares the data from the master configuration file with the information receives from each host server. In other words, the RPM verifier module compares the version number of the installed software package with the approved version number from the master configuration file.

At 506, the RPM verifier module identifies version differences organized or grouped by software packages or by host servers.

For example, a report is generated based on software packages. The report identifies:
  a number of host servers having a version of an installed software package matching the version of the corresponding software package approved in the rules,
  a number of host servers having the version of the installed software package ahead of the version of the corresponding software package approved in the rules,
  a number of host servers having the version of the installed software package behind the version of the corresponding software package approved in the rules, and
  a number of host servers missing the installed software package specified in the rules.

In another example, the report is generated based on each host server. The report identifies:
  a number of installed software packages having a version matching the version of the corresponding software packages approved in the rules for each host server,
  a number of installed software packages having a version ahead of the version of the corresponding software packages approved in the rules for each host server,
  a number of installed software packages having a version behind the version of the corresponding software packages approved in the rules for each host server, and
  a number of software packages missing from each host server.

Figure 6:
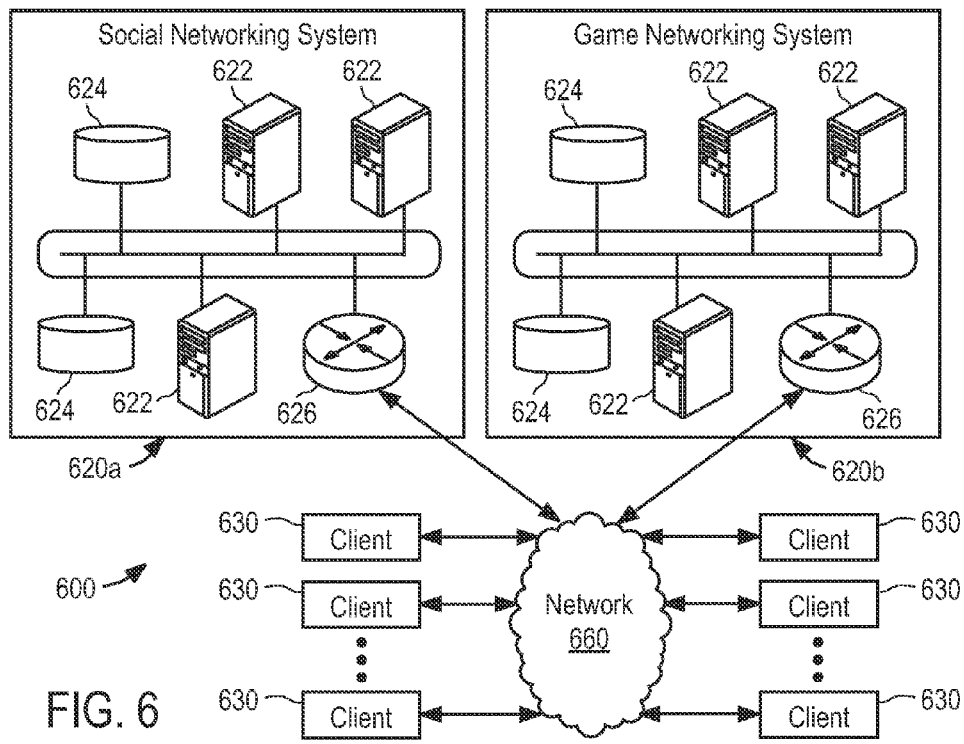
FIG. 6 is a block diagram illustrating an example network environment.

FIG. 6 illustrates an example network environment 600 in which various example embodiments may operate. In particular embodiments, one or more described webpages may be associated with a networking system or networking service. However, alternate embodiments may have application to the retrieval and rendering of structured documents hosted by any type of network-addressable resource or web site. Additionally, as used herein, a user may be an individual, a group, or an entity (such as a business or third-party application).

Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 6 illustrates, particular embodiments may operate in a network environment 600 comprising one or more networking systems, such as social networking system 620a, game networking system 620b, and one or more client systems 630. The components of social networking system 620a and game networking system 620b operate analogously; as such, hereinafter they may be referred to simply as networking system 620. Client systems 630 are operably connected to the network environment 600 via a network service provider, a wireless carrier, or any other suitable means.

Social networking system 620a is a network-addressable computing system that can host one or more social graphs. Social networking system 620a can generate, store, receive, and transmit social networking data. Social networking system 620a can be accessed by the other components of network environment 600 either directly or via network cloud 660. Game networking system 620b is a network-addressable computing system that can host one or more online games. Game networking system 620b can generate, store, receive, and transmit game-related data, such as, for example, game account data, game input, game state data, and game displays.

Networking system 620 is a network addressable system that, in various example embodiments, comprises one or more physical servers 622 and data stores 624. The one or more physical servers 622 are operably connected to network cloud 660 via, by way of example, a set of routers and/or networking switches 626. In an example embodiment, the functionality hosted by the one or more physical servers 622 may include web or HTTP servers, FTP servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 622 may host functionality directed to the operations of networking system 620. Hereinafter, servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII. SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client system 630. The request may also include location information identifying a geographic location of the user's client system 630 or a logical network location of the user's client system 630. The request may also include a timestamp identifying when the request was transmitted.

Although the example network environment 600 described above and illustrated in FIG. 6 is described with respect to social networking system 620a and game networking system 620b, this disclosure encompasses any suitable network environment using any suitable systems. As an example and not by way of limitation, the network environment may include online media systems, online reviewing systems, online search engines, online advertising systems, or any combination of two or more such systems.

Figure 7:
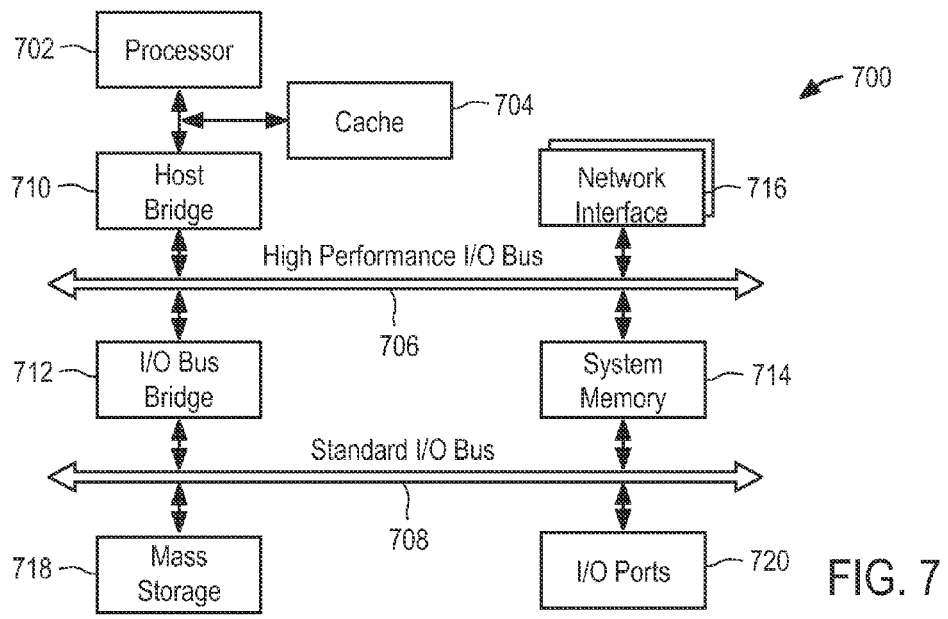
FIG. 7 is a block diagram illustrating an example of a computer system architecture.

FIG. 7 illustrates an example computing system architecture, which may be used to implement a server 622 or a client system 630, both shown in FIG. 6. In one embodiment, hardware system 700 comprises a processor 702, a cache memory 704, and one or more executable modules and drivers, stored on a tangible computer-readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, and the like. Mass storage 718 provides permanent storage for the data and programming instructions to perform the above-described functions implemented in servers 622, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures, and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the hardware system 700 and the hardware components of the hardware system 700. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

MISCELLANEOUS

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

One or more features from any embodiment may be combined with one or more features of any other embodiment without departing from the scope of the disclosure.

A recitation of "a," "an." or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with business-related virtual objects (such as stores and restaurants), the disclosure can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A server comprising:
a storage device comprising a master configuration file and a list of host servers, the master configuration file that defines rules for approved versions of software packages installed on each host server in the list and that defines one or more required software packages, each software package being a separately manageable software unit containing multiple software files packaged together for automated collective Installation,
and a computer-implemented software package verifier module configured to:
query each host server in the list for a version identifier of one or more Installed software packages in each host server,
parse information received from each host server in response to the query for a host server name, a software package installed on each host server, and the version of the Installed software package;
and to apply the rules for each host server to the version identifiers to identify one or more mis-configured software packages on each host server, and
for each one of the listed host servers that has one or more of the software packages missing therefrom, identify the one or more missing software packages for the respective host server based on comparing the corresponding one or more installed software packages with definition in the master configuration file of the one or more required software packages and applying business logic on the results of the comparison.

2. The server of claim 1, wherein the computer-implemented software package verifier is configured to identify one or more software packages installed on a host server having a newer version compared to the approved version of the corresponding software package for the host server as defined in the rules.

3. The server of claim 1, wherein the computer-implemented software package verifier is configured to identify one or more software packages installed on a host server having an older version compared to the approved version of the corresponding software package for the host server as defined in the rules.

4. The server of claim 1, wherein the computer-implemented software package verifier module comprises:
   a querying module configured to query each host server in the list for the version identifier of one or more installed software packages in each host server;
   a parsing module configured to parse information received from each host server in response to the query for a host server name, a software package installed on each host server, and the version of the installed software package; and
   an analysis module configured to apply the rules to the parsed information to identify, for each host server:
      any software packages missing from the host server, and
      one or more installed software packages having a newer or older version compared to the approved version of the corresponding software package as defined in the rules.

5. The server of claim 4, wherein the analysis module is configured to generate a report based on software packages, the report identifying a number of host servers having a version of an installed software package matching the version of the corresponding software package approved in the rules, the number of host servers having the version of the installed software package ahead of the version of the corresponding software package approved in the rules, the number of host servers having the version of the installed software package behind the version of the corresponding software package approved in the rules, and the number of host servers missing the installed software package specified in the rules.

6. The server of claim 4, wherein the analysis module is configured to generate a report based on each host server, the report identifying a number of installed software packages having a version matching the version of the corresponding software packages approved in the rules for each host server, the number of installed software packages having a version ahead of the version of the corresponding software packages approved in the rules for each host server, the number of installed software packages having a version behind the version of the corresponding software packages approved in the rules for each host server, and the number of software packages missing from each host server.

7. The server of claim 1, wherein the rules are based on a name of the software package, a version of the software package, and the name of host servers where the software package is to be installed.

8. The server of claim 1, wherein the rules defines an approved version of a first software package for a first set of host servers, and the approved version of the first software package for a second set of host servers.

9. The server of claim 1, wherein the rules comprises a first set of rules applicable to a first set of host servers identified based on host server names, and a second set of rules applicable to a second set of host servers identified based on host server names.

10. The server of claim 1, wherein the rules comprises a first set of rules applicable to a first set of host servers of a first server pool, and a second set of rules applicable to a second set of host servers of a second server pool.

11. A computer-implemented method comprising:
   retrieving a master configuration file and a list of host servers, the master configuration file that defines rules for approved versions of software packages Installed on each host server in the list and that defines one or more required software packages, each software package being a separately manageable software unit containing multiple software files packaged together for automated collective installation, querying each host server in the list for a version identifier of one or more software packages installed on each host server;
   parse information received from each host server in response to the query for a host server name, a software package installed on each host server, and the version of the installed software package;
   applying the rules for each host server to the version identifiers to identify one or more mis-configured software packages on each host server; and
   for each one of the listed host servers that has one or more software packages missing therefrom, identifying the one or more missing software packages for the respective host server based on comparing the corresponding one or more installed software packages with definition in the master configuration file of the one or more required software packages and applying business logic on the results of the comparison.

12. The computer-implemented method of claim 11, further comprising:
   identifying one or more software packages installed on each host server having a newer version compared to the approved version of a corresponding software package for the host server as defined in the rules; and
   identifying one or more software packages installed on each host server having an older version compared to the approved version of the corresponding software package for the host server as defined in the rules.

13. The computer-implemented method of claim 11, further comprising:
   querying each host server in the list for the version identifier of one or more software packages installed on each host server;
   parsing information received from each host server in response to the query for a host server name, a software package installed on each host server, and a version of the installed software package; and
   applying the rules to the parsed information to identify, for each host server:
      any software packages missing therefrom, and
      one or more software packages installed thereon having a newer or older version compared to the approved version of a corresponding software package as defined in the rules.

14. The computer-implemented method of claim 13, further comprising:
   generating a report based on software packages, the report identifying a number of host servers having a version of an installed software package matching the version of a corresponding software package approved in the rules, a number of host servers having the version of the installed software package ahead of the version of the corresponding software package approved in the rules, the number of host servers having the version of the installed software package behind the version of the corresponding software package approved in the rules, and the number of host servers missing the installed software package specified in the rules.

15. The computer-implemented method of claim 13, further comprising:
    generating a report based on each host server, the report identifying a number of installed software packages having a version matching the version of a corresponding software packages approved in the rules for each host server, the number of installed software packages having a version ahead of the version of the corresponding software packages approved in the rules for each host server, the number of installed software packages having a version behind the version of the corresponding software packages approved in the rules for each host server, and the number of software packages missing from each host server.

16. The computer-implemented method of claim 11, wherein the rules are based on a name of the software package, a version of the software package, and a name of host servers where the software package is to be installed.

17. The computer-implemented method of claim 11, wherein the rules define an approved version of a first software package for a first set of host servers, and an approved version of the first software package for a second set of host servers.

18. The computer-implemented method of claim 11, wherein the rules comprise a first set of rules applicable to a first set of host servers identified based on a first set of host server names or a first pool of servers, and a second set of rules applicable to a second set of host servers identified based on a second set of host server names or a second pool of servers.

19. A non-transitory computer readable storage medium storing a set of instructions that, when executed by at least one processor, cause the processor to perform operations comprising:
    retrieving a master configuration file and a list of host servers, the master configuration file that, defines rules for approved versions of software packages installed on each host server in the list and that defines one or more required software packages, each software package being a separately manageable software unit containing multiple software files packaged together for automated collective installation, querying each host server in the list for a version identifier of one or more software packages installed on each host server;
    parse information received from each host server in response to the query for a host server name, a software package installed on each host server, and the version of the installed software package;
    applying the rules for each host server to the version identifier to identify one or more mis-configured software packages on each host server; and
    for each one of the listed host servers that has one or more software packages missing therefrom, identifying the one or more missing software packages for the respective host server based on comparing the corresponding one or more installed software packages with definition in the master configuration file of the one or more required software packages and applying business logic on the results of the comparison.

\* \* \* \* \*

UNITED STATES PATENT AND TRADEMARK OFFICE
CERTIFICATE OF CORRECTION

PATENT NO.         : 9,448,780 B1
APPLICATION NO.    : 13/324779
DATED              : September 20, 2016
INVENTOR(S)        : Ben Hall It is certified that error appears in the above-identified patent and that said Letters Patent is hereby corrected as shown below:

In the Specification

In Column 5, Line 22, delete "206" and insert --306--, therefor

In Column 5, Line 41, delete "206" and insert --306--, therefor

In Column 5, Line 47, delete "206" and insert --306--, therefor

In Column 7, Line 62, delete "ASCII." and insert --ASCII,--, therefor

In Column 11, Line 41, delete "of"a," "an."" and insert --of "a," "an,"--, therefor In the Claims In Column 12, Line 41, in Claim 1, delete "Installation," and insert --installation,--, therefor In Column 12, Line 45, in Claim 1, delete "Installed" and insert --installed--, therefor In Column 12, Line 50, in Claim 1, delete "Installed" and insert --installed--, therefor In Column 14, Line 4, in Claim 11, delete "Installed" and insert --installed--, therefor Signed and Sealed this
Thirteenth Day of March, 2018

Andrei Iancu
*Director of the United States Patent and Trademark Office*